Nov. 11, 1952  P. E. GILMER  2,617,853
METHOD OF AND SYSTEM FOR MEASURING IMPEDANCE MISMATCH
Filed Jan. 7, 1949  4 Sheets-Sheet 1
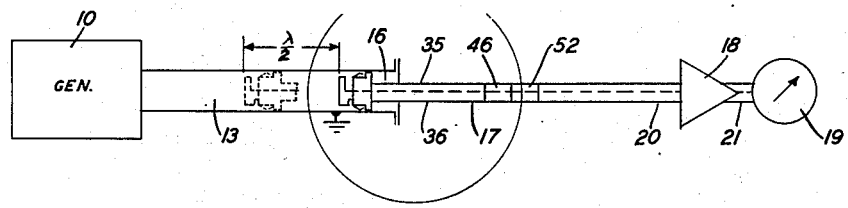
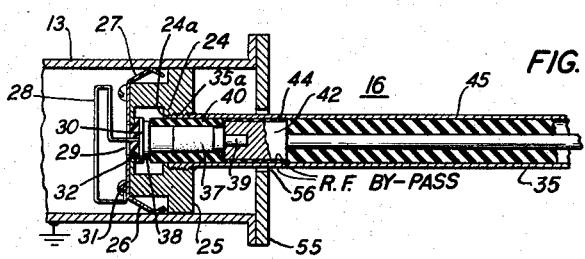
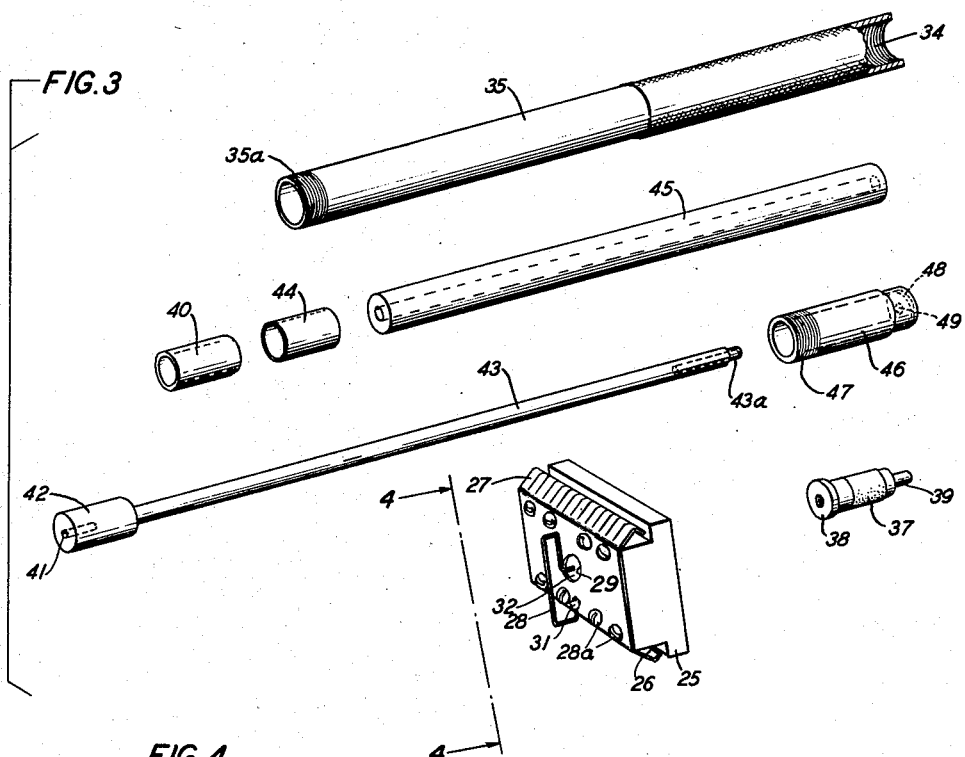
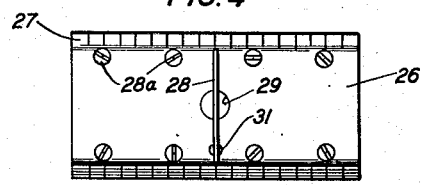
INVENTOR
P.E.GILMER
BY
Patrick J. Roche
ATTORNEY Nov. 11, 1952  P. E. GILMER  2,617,853
METHOD OF AND SYSTEM FOR MEASURING IMPEDANCE MISMATCH
Filed Jan. 7, 1949  4 Sheets-Sheet 2

INVENTOR
P. E. GILMER
BY
Patrick J. Roche
ATTORNEY

Nov. 11, 1952  P. E. GILMER  2,617,853
METHOD OF AND SYSTEM FOR MEASURING IMPEDANCE MISMATCH
Filed Jan. 7, 1949  4 Sheets-Sheet 3

INVENTOR
P. E. GILMER
BY Patrick J. Rocke
ATTORNEY

Nov. 11, 1952            P. E. GILMER            2,617,853

METHOD OF AND SYSTEM FOR MEASURING IMPEDANCE MISMATCH

Filed Jan. 7, 1949            4 Sheets-Sheet 4

INVENTOR
P. E. GILMER
BY
Patrick J. Roche
ATTORNEY

Patented Nov. 11, 1952

2,617,853

UNITED STATES PATENT OFFICE 2,617,853

METHOD OF AND SYSTEM FOR MEASURING IMPEDANCE MISMATCH

Peter E. Gilmer, Florham Park, N. J., assignor to Bell Telephone Laboratories, Incorporated, New York, N. Y., a corporation of New York Application January 7, 1949, Serial No. 69,697

16 Claims. (Cl. 175—183)

1

This invention relates to a method of and system for measuring impedance mismatch in a signal transmission system; and more specifically to a method of and system for measuring impedance mismatch, "looking back" along a transmission line toward a signal generator connected thereto.

As the impedance mismatch of the signal generator to a transmission line may tend to introduce distortion into the transmission system or errors in a measurement system, it is accordingly desirable to know the magnitude of the impedance mismatch of the signal generator to the transmission line in order to control such distortion or errors. In a known type of impedance measuring device, a standing wave detector utilizing a probe movable along a slot formed in a section of wave guide effects measurements of the standing wave in a direction "looking toward" the load. In another known type of impedance measuring device, a standing wave detector including a probe fixed in position in a slotted section of wave guide, relies on the deformation of the wave guide in order to vary an internal dimension thereof.

The present invention contemplates a new and improved method of and system for measuring impedance mismatch in a signal transmission system, "looking back" along a transmission line toward a signal generator connected thereto, without necessarily deforming that transmission line.

The main object of the invention is to provide a new and improved method of and system for measuring impedance mismatch in a wave-guide transmission system "looking back" along the transmission line toward a signal generator connected thereto.

A further object is to provide a new and improved method of and system for determining impedance mismatch in a signal transmission system without necessarily slotting or otherwise deforming the transmission line.

Another object is to provide a method of and system for determining the impedance mismatch of a generator of microwave signals of a predetermined frequency to a wave-guide transmission line transmitting them, "looking back" along such line in the direction toward the signal generator.

Another object is to provide a method of and system for determining the impedance mismatch

2 of each pair of terminals of a network having two pairs of terminals to a wave-guide transmission line, as if the other terminal pair were connected to a matched load.

Another object is to measure the mismatch of the output terminal impedance of an active network to the impedance of a conductor pair.

Another object is to provide a method of and system for determining the mismatch of the output terminal impedance of a signal generator or of a four-terminal network to a transmission line over a predetermined range of signal frequencies.

In a specific embodiment, the invention comprises a generator of signals having a preselected frequency connected to one end of a wave guide having a certain surge impedance, a short-circuiting piston slidable in the interior of the wave guide at the opposite end thereof, a pick-up loop secured to the end of the short-circuiting piston facing the signal generator, and indicating means including a crystal rectifier, an RF by-pass condenser, a rectified-voltage amplifier, and a meter in sequence connected to the probe. The short-circuiting piston and probe are moved a distance equal at least to one-half guide-wavelength of the preselected frequency of the signal generator. For one position of the probe, a maximum reading will be produced on the meter; and for a second position of the probe spaced approximately one-quarter guide-wavelength from its position of maximum reading, a minimum reading will be produced on the meter. The ratio of such maximum reading to such minimum reading will be a measure of the mismatch of the output terminal impedance of the signal generator to the surge impedance of the wave guide connected thereto, "looking back" along the wave-guide transmission line toward the signal generator.

In another embodiment, the invention may be utilized to measure the impedance mismatch of each of the input and output terminal pairs of a four-terminal network to the impedance of a wave-guide transmission line, as if the other terminal pair were connected to a matched load. According to this embodiment, a generator of signal waves of a preselected frequency, a tuner, a wave-guide transmission line, a short-circuiting piston and pick-up loop, and indicating means of the type identified in the first-mentioned embodiment are connected in sequence.

As a first step, the impedance of the signal generator output terminals is substantially matched to the surge impedance of a section of waveguide transmission line by adjustment of the tuner to establish a substantially constant reading on the meter as the piston and pick-up loop are moved a distance approximately equal to one-half guide-wavelength of the preselected frequency of the signal generator. Then, the four-terminal network, is connected in sequence between the aforementioned section of wave guide and a second section of similar wave guide, the piston, pick-up loop and indicating means being transferred to the latter section of wave guide.

Now, the piston and probe are moved approximately one-half guide-wavelength, and the maximum and minimum readings of the meter which will occur at substantially the one-quarter guide-wavelength spacing of the two positions of the probe are noted. Then the network is reversed in the circuit so that its other pair of terminals is connected to the second wave guide. Again the piston and probe are moved approximately one-half guide-wavelength, and the maximum and minimum readings of the meter at substantially the one-quarter guide-wavelength spacing of the two positions of the probe are noted. The ratio of maximum to the minimum readings for each pair of network terminals will be a measure of the impedance mismatch of the respective network terminal pairs to the wave guide as if the other terminal pair were connected to a matched load. In the event that the network is "lossless," the impedance mismatch of both terminal pairs to the same wave guide should be substantially identical in magnitude.

In other embodiments, the invention may be employed to measure the impedance mismatch of a signal generator, a four-terminal network or other transducer to a pair of electrical conductors.

In further embodiments, the invention may be utilized to measure the impedance mismatch of a signal generator and/or a four-terminal network to a wave guide or conductor pair transmitting signal waves over a preselected band of frequencies.

The invention will be readily understood from the following description when taken together with the accompanying drawing in which:

Fig. 1 is essentially a box diagram of a specific embodiment of the invention;

Fig. 2 is an enlarged cross-sectional view of the portion of Fig. 1 enclosed in the circle;

Fig. 3 is an exploded view of Fig. 2;

Fig. 4 is an elevational view taken along the line 4—4 in Fig. 3;

In the following description, the same reference numerals are employed to designate identical elements appearing in the several figures of the drawing.

Figure 5:
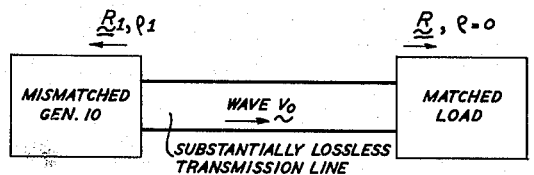
Figs. 5 and 6 are box diagrams illustrating action obtainable in Fig. 1.

Referring to Fig. 1, a generator 10 of signal waves of a preselected frequency is connected to one end of hollow wave guide 13 of rectangular configuration. The preselected frequency of signal generator 10 may be any one for a wave suitable for transmission in the hollow wave guide 13 which may also comprise a circular type, a coaxial conductor line or other enclosed transmission lines. Mounted interiorly of wave guide 13 is one end of a short-circuiting piston 16 adapted for slidable movement therein by an integral handle 17, disposed outside wave guide 13, and having a structure that will be presently explained. The short-circuiting piston 16 is connected through amplifier 18 to a meter 19 by suitable transmission lines 20 and 21. The several circuit components of Fig. 1 may be electrically connected together by coupling apparatus of the type, for example, shown in the copending application of W. W. Mumford, Serial No. 585,096, filed March 27, 1945, now Patent 2,527,146, issued October 24, 1950.

The short-circuiting piston 16 as shown in Figs. 2 and 3 comprises a metallic block 25 having a cross-section substantially equal to that of the interior of wave guide 13 and adapted to slide therein. A threaded portion 24 is formed interiorly of block 25 in the vertical side wall farthest from generator 10 as seen in Fig. 2. An integral shoulder 24a is provided at the end of the threaded portion 24 for a purpose that will appear later. Attached to the vertical side wall of block 25 facing generator 10 in Fig. 1 is a spring member 26 having a high electrical conductivity and formed with a plurality of discrete spring fingers 27, 27 disposed on its opposite sides having the longer dimension. The spring member 26 is mounted on the metallic block 25 by a plurality of screws 28a, 28a, Fig. 4. These fingers 27, 27 in the illustration of Fig. 1 are positioned along a transverse axis of the wave guide 13 and engage opposite interior side walls thereof with the longer dimension.

A pick-up loop or antenna 28 projects through an opening 29 provided substantially centrally of the end of the block 25 adjacent spring member 26. One end of probe 28 terminates interiorly of block 25 in contact plate 30 for a purpose that will appear later herein, and the opposite end is soldered to the spring member 26 at point 31 so as to orient the probe 28 in a desired predetermined position with reference to the waves originating in generator 10 and being transmitted in wave guide 13 for a purpose that will be subsequently explained. The soldering of the pick-up loop 28 constitutes a return path for the rectified current to be mentioned later. A solid dielectric 32 serves to insulate electrically the probe 28 as it passes through the opening 29 in the block 25 and spring member 26 as above mentioned. Thus, the contact plate 30 is electrically insulated from the block 25 and spring member 26.

The handle 17 constituting the outer conductor 35 of a coaxial line 36 to be identified hereinafter includes in Fig. 3 an externally threaded portion 35a at its left-hand end accommodated in the threaded portion 24 of block 25 whereby the handle 17 is firmly attached thereto. The handle 17 also includes an internally threaded portion 34 at its right-hand end for a purpose that will be mentioned subsequently. A crystal rectifier 37 of conventional structure is formed with an annular surface 38 at its left-hand end for establishing good electrical contact with the plate 30 of probe 28, Fig. 2, and on its right-hand end with a reduced cylindrical portion 39. A dielectric sleeve 40 electrically insulates the outer surface of rectifier 37 from the internal surface of handle 17 when the former is assembled therein. The reduced portion 39 is accommodated in an internal cylindrical slot 41 formed in enlarged end 42 of an elongated rod 43 both of which constitute the inner conductor of the coaxial line 36 previously mentioned. The extreme right-hand end of rod 43 is formed with a hollow reduced portion 43a. A dielectric sleeve 44 insulates electrically the external surface of enlarged end 42 from the internal surface of outer conductor 35 so that an RF by-pass condenser is constituted thereby. An elongated dielectric sleeve 45 electrically insulates the external surface of rod 43 from the internal surface of handle 17.

A plug 46, Figs. 1, 2 and 3, has an externally threaded portion 47 provided on the left-hand end for accommodation in the internally threaded portion 34 of the handle 17. A wafer-type dielectric washer 48 is fixedly positioned interiorly of the opposite end of plug 46 and includes a central aperture 49 for accommodating the reduced end portion 43a of the elongated rod 43 when the latter is assembled in the interior of handle 17 as shown in Fig. 2. The assembly of piston 16 as shown in Figs. 1, 2, 3 and 4 is held together when the plug 46 is properly screwed into the handle 17, Fig. 2, when the innermost end of handle 17 abuts the shoulder 24a in Fig. 2.

Thus, block 25, handle 17 and plug 46 constitute the outer conductor of coaxial line 36; and the portion of probe 28 having contact plate 30, enlarged end 42 of the rod 43, and the rod 43 including its integral reduced portion 43a, constitute the inner conductor of coaxial line 36, the rectifier 37 being built into the inner conductor. An end plate 55 attached suitably to the end of wave guide 13 in Fig. 2 contains a hole 56 for permitting handle 17 to freely pass therethrough, and at the same time serving as a guide for the piston 16 during the slidable movements thereof.

Assuming that the signal generator 10 is adapted to transmit electromagnetic waves of a preselected frequency of the dominant mode in wave guide 13, the circuit of Fig. 1 is now arranged to measure the mismatch of the terminal impedance of signal generator 10 to the surge impedance of wave guide 13, "looking back" along the latter towards signal generator 10. Inasmuch as signal waves of the dominant mode are being transmitted in wave guide 13 as above mentioned, the probe 28 is so oriented in the electric field of such waves as to pick-up sufficient electrical energy to actuate meter 19 in Fig. 1 for a purpose of measuring the aforementioned impedance mismatch according to a method that will be presently explained. The following explanation describes the operation of Fig. 1 from one mathematical viewpoint, utilizing the interaction or repeated reflection effects that cause distortion in the transmitted signal or error in measurements.

The symbols employed in the following explanation are as follows:

In the following equations, $\underline{R}$ = reflection coefficient (phasor)
$\rho$ = reflection coefficient [1] (scalar)
$\underline{S}$ = standing wave ratio [1] (scalar)
$\underline{\overline{V}}$ = voltage [1] (vector)
$\tilde{V}$ = voltage [1] (scalar)
$\beta$ = phase constant [1] (scalar)
exp = exponential function [1]
$\approx$ = approximately equal to [2] (sign)

[1] Listed in Institute of Radio Engineer Standards of Abbreviations, Graphical Symbols, Letter Symbols, and Mathematical Signs, 1948.
[2] Listed in American Institute of Electrical Engineers booklet, Information for Authors, 1948.

Referring to Fig. 5, let it be initially assumed that signal generator 10 has a reflection coefficient $\underline{R}_1$, $\rho_1$ and supplies signal waves having a voltage $\tilde{V}_0$ to a substantially lossless transmission line terminated in a load which is matched to the latter. In such event, the matched load has a reflection coefficient $\underline{R}$, $\rho = 0$. Now, there will be signal waves traveling in one direction only, i. e., in the direction from the mismatched generator 10 in Fig. 1 via wave guide 13 to the matched load as indicated by the arrow in Fig. 5.

Figure 6:
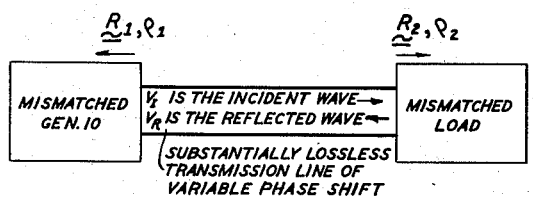

Now, let it be assumed that the matched load in Fig. 5 is replaced with a mismatched load having a reflection coefficient $\underline{R}_2$, $\rho_2$ as shown in Fig. 6. Now there will be two waves traveling in the opposite directions as indicated by the arrows in wave guide 13. The incident wave $\tilde{V}_I$ is traveling from the signal generator 10 toward the mismatched load, and may be represented by the wave $\tilde{V}_0$ in Fig. 5 plus a twice reflected component of $\tilde{V}_I$ itself as shown below. Let $\beta$ represent the phase shift of wave guide 13 in Fig. 6.

$$\underline{V}_I = \underline{V}_0 + \underline{V}_I \underline{R}_1 \underline{R}_2 \exp -2j\beta \tag{1}$$

Solving Equation 1 for $\tilde{V}_I$ then $$\underline{V}_I = \frac{V_0}{1 + \underline{R}_1 \underline{R}_2 \exp -2j\beta} \tag{2}$$

If now $\beta$ is varied, the magnitude of $\tilde{V}_I$ will have maximum and minimum values, the ratio of the maximum to minimum magnitude $\tilde{V}_I$ being $$\frac{\tilde{V}_I \max}{\underline{V}_I \min} = \frac{1 + \rho_1 \rho_2}{1 - \rho_1 \rho_2} \tag{3}$$

If $\rho_2 \approx 1$ and $\rho_1 \ll \rho_2$, then $$\frac{\tilde{V}_I \max}{\underline{V}_I \min} \approx \frac{1 + \rho_1}{1 - \rho_1} = \underline{S}_1 \tag{4}$$

$\underline{S}_1$ being the VSWR, voltage standing wave ratio, of signal generator 10.

Alternately, Equation 3 may be written $$\rho_1 \rho_2 = \frac{\frac{\tilde{V}_I \max}{\tilde{V}_I \min} - 1}{\frac{\tilde{V}_I \max}{\tilde{V}_I \min} + 1} \tag{5}$$

If the ratio of maximum to minimum voltage $\tilde{V}_I$ is defined as an apparent standing wave ratio $$\frac{\tilde{V}_I \max}{\tilde{V}_I \min} = \underline{S}_{12} \tag{6}$$

and the corresponding reflection coefficient is defined $$\frac{S_{12}-1}{S_{12}+1}=\rho_{12} \quad (7)$$

then Equation 5 may be rewritten $$\rho_1\rho_2=\rho_{12}=\frac{S_{12}-1}{S_{12}+1} \quad (8)$$

Since for any given amount of phase shift $V_I$ is proportional to $V_R$ and is also proportional to $V_L$ (voltage picked up by loop 28) we may expand Equation 6

$$S_{12}=\frac{V_I \max}{V_I \min}=\frac{V_L \max}{V_L \min} \quad (9)$$

Thus, with the aid of Equation 4 for approximate solutions or Equations 8 and 9 for substantially exact solutions, any circuit substantially equivalent to Fig. 6 may be utilized to measure the impedance mismatch at the output terminals of signal generator 10 to the surge impedance of wave guide 13 when a suitable instrumentality is available for measuring a quantity proportional to voltage $V_L$ or $V_I$. This will now be explained.

Referring to Fig. 1 which is assumed to be in an operating condition, the piston 16 and pickup loop 28 are moved a distance equal at least to one-half guide-wavelength of the preselected frequency of generator 10. This movement of piston 16 effects a shift of phase $\rho$ as contemplated in the foregoing mathematics. For one position of the piston and pick-up loop, a maximum reading will be produced on meter 19; and for the position of the piston and pick-up loop spaced approximately a distance of one-quarter guide-wavelength from such one position, a minimum reading will be produced on meter 19. The ratio of the maximum reading to the minimum reading will be a measure of the mismatch of the output terminal impedance of signal generator 10 to the surge impedance of wave guide 13, "looking back" along the latter toward signal generator 10. With a square-law rectifier and a linear meter, the square root of this ratio will be approximately equal to the standing wave ratio of the signal generator 10. Knowing the value of $\rho_2$ which may be found by using a conventional apparatus such, for example, as a standing wave detector or a directional coupler, a substantially exact solution for $\rho_1$ may be found by utilizing Equations 8 and 9.

Figure 7:
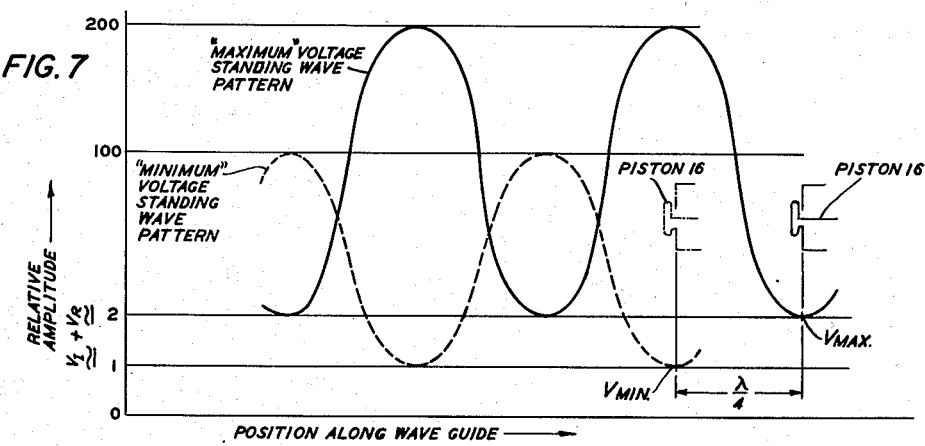
Fig. 7 is a curve representing certain action in Fig. 1.

The foregoing mathematical description is sufficient proof to establish that the method of utilizing Fig. 1, as just described, will measure the mismatch of the output terminal impedance of generator 10 to the surge impedance of wave guide 13. However, a description is given below of the variation of the standing wave pattern in wave guide 13 in Fig. 1 as a further help in understanding this method. Referring to Fig. 7, the full line represents the standing wave pattern when the phase shift $\beta$ in Figs. 1 and 6 is such as to give the maximum amplitude of a resultant wave $V_I$ maximum traveling to the right and the broken line represents the standing wave pattern when the phase shift $\beta$ is such as to give the minimum amplitude of a resultant wave $V_I$ minimum traveling to the left in wave guide 13, Figs. 1 and 6. The equations for such waves $V_I$ maximum and $V_I$ minimum as derived from Equation 2 are $$V_I \max = \frac{V_0}{1-\rho_1\rho_2} \quad (10)$$

$$V_I \min = \frac{V_0}{1+\rho_1\rho_2} \quad (11)$$

The maximum and minimum amplitudes $V_R$ maximum and $V_R$ minimum, respectively, of the resultant reflected wave are $$V_R \max = \rho_2 V_I \max \quad (12)$$

$$V_R \min = \rho_2 V_I \min \quad (13)$$

More specifically the full line in Fig. 7 represents the interference pattern of $V_I$ maximum with $V_R$ maximum and the broken line represents an interference pattern of $V_I$ minimum with $V_R$ minimum. The voltage $V_L$ picked up by loop 28 in Figs. 1, 2 and 7 will occur at some particular point with respect to the maximum or minimum position on each standing wave pattern as indicated in Fig. 7. These points will usually be in proximity to the lowest or deepest portion of the pattern and will be substantially one-quarter guide-wavelength apart as shown in Fig. 7. Thus, it can be seen that the ratio $$\frac{V_L \max}{V_L \min}$$

represents the ratio of one particular point on a maximum standing wave pattern to a corresponding point on a minimum standing wave pattern. It is, therefore, obvious that the standing wave pattern is changed in both amplitude and position when the piston 16 in Figs. 1 and 7 is moved. It will be apparent the foregoing is a departure from the conventional method of measuring a fixed standing wave pattern with the familiar movable probe.

Figure 8:
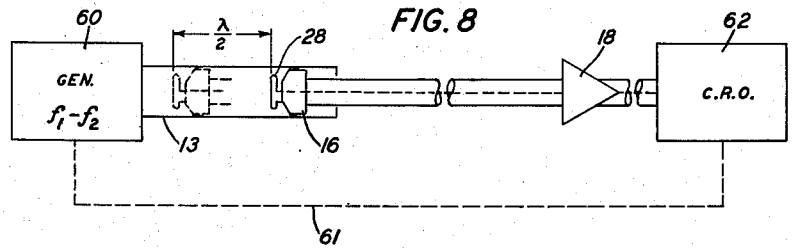
Fig. 8 is the specific embodiment of Fig. 1 adapted for use over a preselected band of signal frequencies.
Figure 8A:
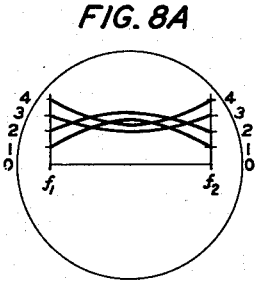
Fig. 8A is a front view of a screen embodied in cathode ray oscilloscopes in Figs. 8, 11, 12 and 14.

Fig. 8 illustrates an arrangement for determining the mismatch of the output terminal impedance of a signal generator 60 to the surge impedance of hollow wave guide 13 where the generator 60 is supplying signals extending over a preselected frequency range $f_1$—$f_2$. A connection 61 represents the signal generator 60 and horizontally deflecting plates of the cathode-ray oscilloscope 62 driven in synchronism over the frequency band $f_1$—$f_2$. Piston 16 and probe 28 are reciprocated over at least one-half guide-wavelength distance at the lowest frequency in the band $f_1$—$f_2$ by an arrangement, not shown, in a non-synchronous relation with reference to the sychronized signal generator 60 and the horizontally deflecting plates of oscilloscope 62. The probe 28 is connected via a coaxial conductor 36, which includes the rectifier mount 37 and RF by-pass condenser in Figs. 1, 2 and 3, and amplifier 18 to the vertical deflecting plates of the oscilloscope 62. The screen of the oscilloscope 62 is suitably calibrated over the preselected frequency band $f_1$—$f_2$ as shown, for example, in Fig. 8A. The ratio of the maximum to the minimum indications on the oscilloscope screen at each frequency in the preselected band $f_1$—$f_2$ shown in Fig. 8A may be interpreted as a measure of the mismatch of the output terminal impedance of signal generator 60 to the surge impedance of wave guide 13 at each such frequency in the signal band $f_1$—$f_2$. The standing wave ratio of generator 60 at each frequency in the band $f_1$—$f_2$ may also be obtained as above-mentioned in connection with Fig. 1.

Figure 9:
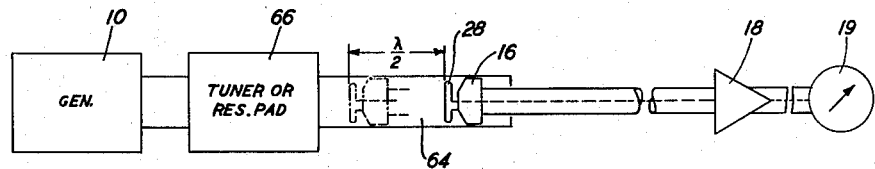
Figs. 9 and 10 are essentially box diagrams of the specific embodiment of Fig. 1 adapted for use with a four-terminal network.
Figure 10:
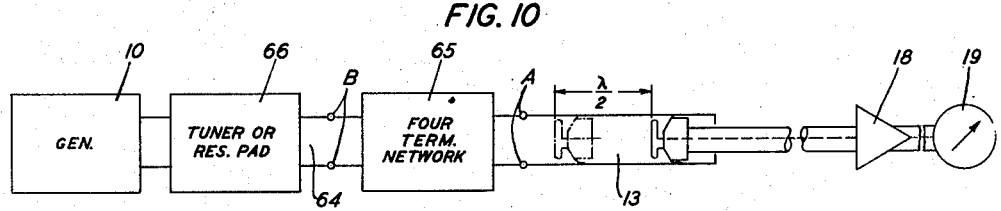

Figs. 9 and 10 illustrate circuits for determining the impedance mismatch of a pair of output terminals A, A of a four-terminal network 65 to the surge impedance of hollow wave guide 13 as if the other terminal pair were connected to a matched load at a preselected frequency of the signal waves supplied by signal generator 10. Referring now to Fig. 9, tuner or matched resistance pad 66 of conventional structure is so adjusted that the reading of meter 19 is made a constant as the piston 16 and probe 28 are moved back and forth in the interior of wave guide 64 a distance of approximately one-half wavelength at the preselected frequency of signal waves of signal generator 10. This tends to match the output terminal impedance of signal generator 10 to the surge impedance of wave guide 64 in Fig. 9.

Next, referring to Fig. 10, the four-terminal network 65 has its input terminals B, B connected to wave guide 64 and its output terminals A, A to wave guide 13. Then the piston 16 and probe 28 are moved in the interior of wave guide 13 a distance equal approximately to one-half guide-wavelength at the preselected frequency of the signal waves supplied by generator 10. The ratio of the maximum to the minimum readings shown on meter 19 at the two positions spaced approximately one-quarter guide-wavelength apart as previously mentioned in connection with Fig. 1 will be a measure of the impedance mismatch of the terminals A, A of the four-terminal network 65 to the surge impedance of wave guide 13, as if the terminals B, B were connected to a matched load. For determining the impedance mismatch of the input terminals B, B to the surge impedance of wave guide 13, the four-terminal network 65 is reversed in Fig. 10 so that the terminal pairs A, A and B, B are connected to the wave guides 64 and 13, respectively, in Fig. 10, and the foregoing procedure is repeated. In the event that the four-terminal network is lossless, the impedance mismatch of the output terminals A, A and B, B to the surge impedance of wave guide 13 should be substantially equal in magnitude. The standing wave ratio of generator 10 may be obtained as above indicated regarding Fig. 1.

Figure 11:
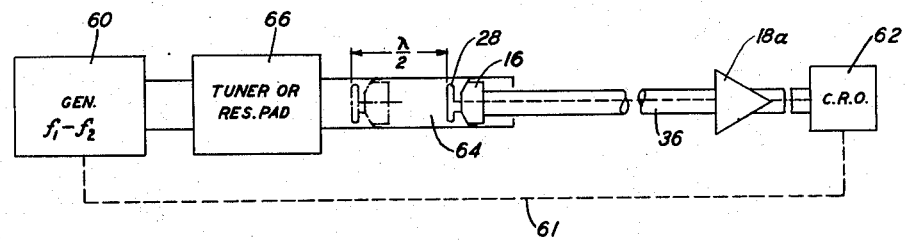
Figs. 11 and 12 are essentially box diagrams illustrating the arrangements of Figs. 9 and 10, respectively, adapted for use over a preselected band of signal frequencies.
Figure 12:
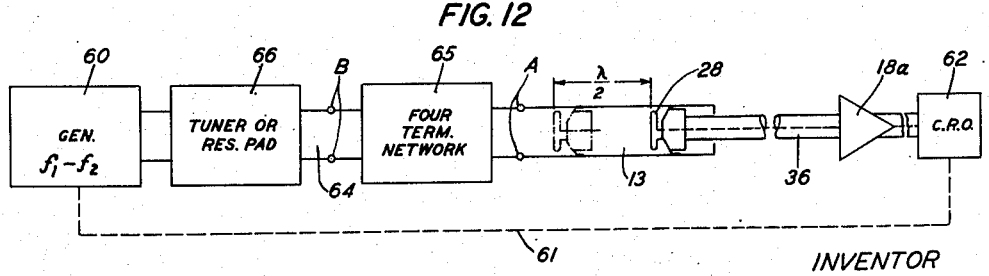

Figs. 11 and 12 illustrate circuit arrangements for measuring the impedance mismatch of the output terminals A, A and B, B of four-terminal network 65 to the surge impedance of wave guide 13 over a preselected frequency band $f_1$—$f_2$ of the signals supplied by generator 60. A connection 61 represents the signal generator 60 and horizontally deflecting plates of cathode-ray oscilloscope 62 driven in synchronism over the signal frequency band $f_1$—$f_2$. Piston 16 and probe 28 are oscillated over the one-half wavelength distance at each frequency in the band $f_1$—$f_2$ by an arrangement, not shown, in a non-synchronous relation with reference to the synchronized signal generator 60 and the horizontal plates of oscilloscope 62. The probe 28 is connected via coaxial conductor 36, which includes the rectifier mount 27 and RF by-pass condenser in Figs. 1, 2 and 3, and amplifier 18a, to vertically deflecting plates of the cathode-ray oscilloscope 62. The output terminals of signal generator 60 are matched to the surge impedance of wave guide 64 over the frequency range $f_1$—$f_2$ as described above concerning Figs. 9 and 10. Then the mismatch of the output terminal impedance of the respective terminal pairs A, A and B, B of the four-terminal network 65 to the wave guide 13 is indicated on the screen of oscilloscope 62, Fig. 8A as above explained regarding Fig. 8.

Figure 13:
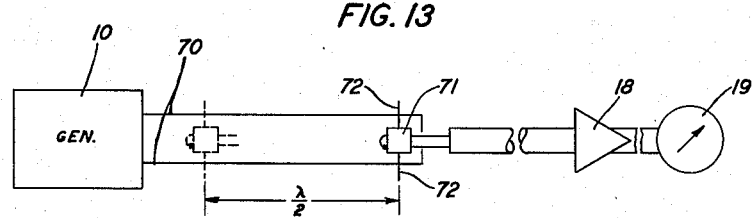
Fig. 13 is essentially a box diagram of the embodiment of Fig. 1 adapted for use with a conductor pair.

Fig. 13 shows an arrangement for measuring the mismatch of the output terminal impedance of signal generator 10 to conductor pair 70, 70 having a characteristic impedance. For this purpose, a short-circuiting pick-up probe 71 is moved a distance of at least one-half wavelength of the preselected frequency of signal generator 10 with its conductors 72, 72 engaging conductors 70, 70. In this connection, it will be understood that the probe 72 includes a crystal rectifier and RF by-pass condenser similar to the corresponding elements mentioned above in Figs. 1, 2 and 3. The operation of Fig. 13 is the same as that described previously regarding Fig. 1. A practical limitation on the measuring frequency in Fig. 13 involves the half wave distance which the probe 71 is moved, such distance being kept to a reasonable limit. This limitation, it will be understood, may be overcome by the use of a substantially constant impedance phase shifter or an adjustable artificial line.

Figure 14:
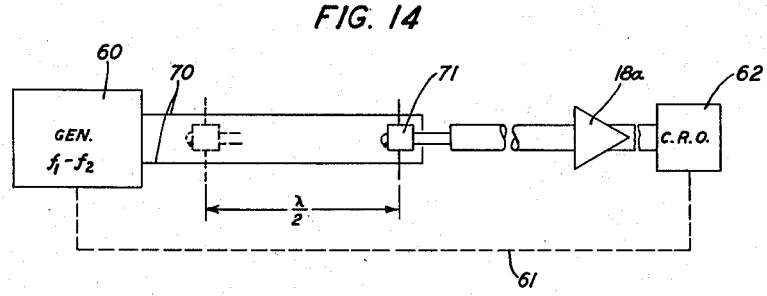
Fig. 14 is essentially a box diagram of Fig. 13 adapted for use over a preselected band of signal frequencies.

Fig. 14 shows the arrangement of Fig. 13 adapted to measure the impedance mismatch of signal generator 60 to conductor pair 71, 71 over the band $f_1$—$f_2$ of signal frequencies. The operation of Fig. 14 is essentially that explained previously with reference to Figs. 8 and 8A.

It will be understood that the invention may also be used with a solid dielectric transmission line adapted with a suitable reflecting device, instead of the short-circuiting piston movable therealong; and that a suitable reflecting device could also be used with a hollow transmission line or a conductor pair.

What is claimed is:

1. In a signaling transmission system including a transmission line and an active network connected to one end thereof and transmitting microwaves, means for determining the mismatch of the output terminal impedance of said network to the impedance of said line, said means comprising a short-circuiting device slidably connected to the opposite end of said line, an antenna fastened to said device, detecting means connected to said antenna, and measuring means connected to said detecting means, said device and antenna being moved at least a predetermined distance on said line to detect and measure a maximum amount of electrical energy, said device and antenna being moved a further predetermined distance on said line in the direction looking on said line toward said network to detect and measure a minimum amount of electrical energy, the ratio of said measured maximum amount of electrical energy to said measured minimum amount of electrical energy serving as a determination of the mismatch between the output terminal impedance of said network and the impedance of said line.

2. The system according to claim 1 in which said line comprises a pair of conductors having corresponding ends connected to output terminals of said network, said short-circuiting device is disposed across said pair of conductors adjacent the opposite ends thereof, said short-circuiting device and antenna are moved a distance equal to at least one-half wavelength of at least one frequency of the microwaves being transmitted on said line to detect and measure said maximum amount of electrical energy, and said short-circuiting device and antenna are moved on said conductors a distance equal substantially to one-quarter wavelength of said one frequency in a direction looking along said conductors toward said network output terminals to detect and measure said minimum amount of electrical energy.

3. The system according to claim 1 in which said line comprises a wave guide having one end connected to said network output, said short-circuiting device is positioned interiorly of said guide adjacent the opposite end thereof, said antenna is mounted on the end of said device facing said network output, and said device and antenna are moved a distance equal to at least one-half guide wavelength at at least one frequency of the microwaves being transmitted in said guide to detect and measure said maximum amount of electrical energy, and said device and antenna are moved substantially one-quarter guide wavelength in said guide at said one microwave frequency in a direction looking along said guide toward said network output to detect and measure said minimum amount of electrical energy.

4. In a signaling transmission system comprising a network transmitting signal waves of a preselected frequency, and a pair of conductors having one end connected to said network, means for determining the mismatch of the output terminal impedance of said network to the impedance of said conductor pair, said means comprising a short-circuiting device slidably connected across said conductor pair adjacent the opposite end thereof, a pick-up probe attached to said device to face said network, and indicating means connected to said probe, said device and probe being moved a distance equal to at least one-half wavelength at said preselected frequency for indicating on said indicating means maximum and minimum amounts of electrical energy, said amounts occurring substantially one-quarter wavelength apart at said preselected frequency, the ratio of said maximum amount to said minimum amount representing the mismatch of the output terminal impedance of said network to the impedance of said conductor pair.

5. In a microwave signaling system, a wave guide, a generator of microwave signals of preselected frequency connected to one end of said guide, and means connected to said guide adjacent the opposite end thereof for determining the mismatch of the output terminal impedance of said generator to the impedance of said guide, said means comprising a short-circuiting device slidable in the interior of said guide, a pick-up probe secured to the end of said device facing said generator, and indicating means connected to said device and probe, said device and probe being moved predetermined distances at said preselected frequency in said guide for obtaining maximum and minimum readings on said indicating means, the ratio of said maximum reading to said minimum reading serving to determine the impedance mismatch of said generator to said guide.

6. The system according to claim 5 in which said indicating means includes rectifying means and an R-F by-pass condenser connected to said probe.

7. In a microwave signaling system, a wave guide, a generator of microwave signals of preselected frequency connected to one end of said guide, and means slidably positioned in the interior of the opposite end of said guide for determining the mismatch of the output terminal impedance of said generator to the impedance of said line, said means comprising a hollow metallic head, a plurality of conductive fingers mounted on the end of said head facing said generator, said fingers engaging the interior walls of said guide, a pick-up probe attached to said end of said head facing said generator, said probe having one end secured to said fingers and its opposite end terminating in the interior of said head and insulated therefrom, a coaxial line having its outer conductor connected to said head and the inner conductor connected to said opposite end of said probe, a rectifier, a metallic element having an outside diameter smaller than the inside diameter of said outer conductor but greater than the outside diameter of said inner conductor, said rectifier and element being positioned in the interior of said outer conductor in series with said inner conductor and opposite end of said probe, dielectric means for insulating said rectifier and element from the interior surface of said outer conductor, said element, dielectric means and outer conductor constituting an R-F by-pass condenser, said coaxial line having its free end projecting exteriorly of said guide, and indicating means connected to the free end of said coaxial line, said slidable means being moved in said guide to provide a maximum and a minimum reading on said indicating means, the ratio of said maximum reading to said minimum reading determining said impedance mismatch of said generator to said guide.

8. The method of measuring the mismatch between the impedance of the output of a network transmitting signals of a preselected frequency, and the impedance of a transmission line connected to said output, which comprises transmitting said signals through said network output and said line, detecting and measuring a voltage maximum at a certain point of a standing wave on said line, and detecting and measuring a voltage minimum of said standing wave at another point removed from said certain point a distance equal substantially to one-quarter wavelength of said preselected frequency in a direction looking along said line toward said network output, the ratio of the measured voltage maximum to the measured voltage minimum being a measure of the impedance mismatch between said network output and said line at said preselected signal frequency.

9. The method of measuring the impedance mismatch between a preselected output of a network transmitting microwave signals of at least one frequency and a transmission line connected thereto, which comprises transmitting said signals through said preselected network output and said line at the same time, moving a standing wave a predetermined distance along said line to obtain an indication of the electrical energy of said standing wave at a point in proximity of a lowermost portion thereof, and moving said standing wave a distance equal substantially to one-quarter wavelength along said line in a direction looking toward said preselected network output to obtain an indication of the electrical energy at another point in proximity of a further lowermost portion of said last-mentioned standing wave, the ratio of said indication at said first-mentioned point to said indication at said second-mentioned point being a measure of said impedance mismatch between said preselected network output and said line at at least said one signal frequency.

10. The method of measuring the impedance mismatch between a network output transmitting signals of at least one frequency and a transmission line connected thereto, which comprises simultaneously transmitting said signals through said network output and said line, adjusting the phase of a standing wave on said line at least a predetermined amount to detect and measure the voltage maximum substantially at a certain point thereon, and further adjusting the phase of said standing wave to an amount substantially equal to one-quarter wavelength of said one frequency in a direction looking on said line toward said network output to detect and measure a voltage minimum at another point corresponding substantially to said certain point on said standing wave, the ratio of the measured voltage at said certain point to the measured voltage at said corresponding point being a measure of the impedance mismatch between said network output and said line at said one signal frequency.

11. The method of measuring the impedance mismatch between the output of a generator of microwaves of at least one frequency, and a wave guide transmission line connected thereto, which comprises transmitting said microwaves through said output and said guide, deriving a maximum voltage from a standing wave on said guide during a phase adjustment of said standing wave of the order of one-half guide-wavelength at said one frequency, and deriving a minimum voltage from said standing wave on said guide after said standing wave has been adjusted in phase an amount of the order of one-quarter guide-wavelength in a direction looking along said guide toward said generator output, the ratio of the derived maximum voltage to the derived minimum voltage being a measure of the impedance mismatch between said generator output and said line at said one frequency.

12. The method of measuring the mismatch between the impedance of the output of an operative source of signals of a preselected frequency and the impedance of a transmission line connected to said signal source output, which method comprises propagating said signals through said signal source output and said line, short-circuiting said line at successive points over a predetermined length thereof to derive and measure a maximum amount of electrical energy at a first point of a standing wave on said line, and short-circuiting said line at a second point located a further predetermined distance from said first point in a direction looking back on said line toward said signal source output to derive and measure a minimum amount of electrical energy of said standing wave at a second point, the ratio of the measured maximum electrical energy at said first point to the measured minimum electrical energy at said second point being a measure of the impedance mismatch between said signal source output and said line at said preselected signal frequency.

13. The method of measuring the impedance mismatch between the input and output terminals of a network and a transmission line in a system transmitting microwaves of predetermined frequency, which method comprises transmitting microwave energy through said output terminals and said line, short-circuiting said line at a first point to detect and measure the maximum electrical energy of a standing wave at said first point, short-circuiting said line at a second point located closer to said output terminals by a distance equal substantially to at least one-quarter wavelength of said predetermined frequency in order to detect and measure the minimum electrical energy of the standing wave at said second point, the ratio of the maximum energy at said first point to the minimum energy of said second point being a measure of the impedance mismatch between said output terminals and said line, substituting said input terminals for said output terminals and transmitting microwave energy through said input terminals and said line, short-circuiting said line a third point to detect and measure the maximum electrical energy of a standing wave at said third point, short-circuiting said line at a fourth point located closer to said last-mentioned input terminals by a distance equal substantially to at least one-quarter wavelength of said predetermined frequency so as to detect and measure the minimum electrical energy of the standing wave at said fourth point, the ratio of the maximum energy at said third point to the minimum energy at said fourth point being a measure of the impedance mismatch between said input terminals and said line.

14. In a signal transmission system including a source of signals of at least one frequency, a transmission line, and a network having at least two pairs of terminals, means for measuring the impedance mismatch between said line and a preselected network terminal pair connected thereto, said means comprising said network having said preselected terminal pair connected to one end of said line and the other terminal pair connected to said source, a short-circuiting device movably engaging line adjacent the opposite end thereof, an antenna mounted on said device, and detecting and measuring means connected to said antenna, said device and antenna being moved on said line a distance equal approximately to one-half wavelength at said one frequency to detect and measure a maximum voltage, said device and antenna being further moved on said line a distance equal approximately to one-quarter wavelength at said one frequency in a direction looking along said line toward said network to detect and measure a minimum voltage, the ratio of said measured maximum voltage to said measured minimum voltage being a measure of the impedance mismatch between said line and said preselected network terminal pair at said one signal frequency.

15. In a system for measuring the impedance mismatch between a certain output of a network and a transmission line connected to said certain output, said network transmitting signal waves of preselected frequency via said certain output thereof to said line, means movably mounted on said line for effecting a short circuit thereof, an electrical pick-up carried on said short-circuiting means and disposed toward said certain network output, and detecting and measuring means connected to said pick-up, said last-mentioned means providing a maximum voltage measurement at one point of a standing wave within a movement of said short-circuiting means and pick-up along said line over a distance equal substantially to one-half wavelength at said preselected signal frequency, said detecting and measuring means providing a minimum voltage measurement at a corresponding point on said standing wave in response to a movement of said short-circuiting means and pick-up along said line looking toward said certain network output over a distance equal substantially to one-quarter wavelength at said preselected signal frequency, the ratio of said maximum voltage measurement to the minimum voltage measurement being a measure of the impedance mismatch between said certain network output and said line.

16. A system for measuring the impedance mismatch between a signal transmission line and a pair of terminals of a network connected to one end of said line and transmitting thereto signal waves of the preselected frequency range, a pick-up, a short-circuiting device movably connected to said line adjacent the opposite end thereof and carrying said pick-up in such manner that said pick-up is oriented toward said network terminal pair, detecting and measuring means including a cathode-ray oscilloscope connected to said pick-up, said oscilloscope having a pair of horizontally deflecting plates, a pair of vertically deflecting plates connected to said pick-up, and a screen provided with a calibration thereon, means for synchronizing said signal source and said horizontally deflecting plates over said preselected frequency range, means for reciprocating said device and pick-up over a distance equal substantially to one-half wavelength at the lowest frequency in said preselected frequency range to produce maximum and minimum voltage indications on said screen for the respective frequencies in said preselected range thereof, the ratio of said maximum indications to the minimum indications on said screen, with reference to said calibration on said screen, being a measure of the impedance mismatch between said line and network terminal pair at the respective frequencies in said preselected range thereof.

PETER E. GILMER.

REFERENCES CITED

The following references are of record in the file of this patent:

UNITED STATES PATENTS

| Number    | Name     | Date          |
|-----------|----------|---------------|
| 2,191,271 | Carter   | Feb. 20, 1940 |
| 2,302,143 | Pickles  | Nov. 17, 1942 |
| 2,323,076 | Paul     | June 29, 1943 |
| 2,400,597 | Peterson | May 21, 1946  |
| 2,404,797 | Hansen   | July 30, 1946 |
| 2,454,042 | Dettinger| Nov. 16, 1948 |
| 2,472,785 | Blitz    | June 14, 1949 |
| 2,516,169 | Wong     | July 25, 1950 |
| 2,530,248 | Larson   | Nov. 14, 1950 |

OTHER REFERENCES

Electronics, June 1945, pages 97–101.